United States Patent
Cristina et al.

(10) Patent No.: US 12,225,032 B2
(45) Date of Patent: Feb. 11, 2025

(54) METHOD OF ANALYSING ANOMALOUS NETWORK TRAFFIC

(71) Applicant: BRITISH TELECOMMUNICATIONS PUBLIC LIMITED COMPANY, London (GB)

(72) Inventors: Claudia Cristina, London (GB); Simon Beddus, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 225 days.

(21) Appl. No.: 17/915,466

(22) PCT Filed: Mar. 5, 2021

(86) PCT No.: PCT/EP2021/055696
§ 371 (c)(1),
(2) Date: Sep. 28, 2022

(87) PCT Pub. No.: WO2021/197760
PCT Pub. Date: Oct. 7, 2021

(65) Prior Publication Data
US 2023/0129367 A1  Apr. 27, 2023

(30) Foreign Application Priority Data
Mar. 31, 2020 (GB) .................................. 2004748

(51) Int. Cl.
H04L 9/40 (2022.01)
(52) U.S. Cl.
CPC .......... *H04L 63/1425* (2013.01); *H04L 63/20* (2013.01)

(58) Field of Classification Search
CPC . H04L 63/1425; H04L 63/20; H04L 63/0227; H04L 63/1441; H04L 67/12; H04L 2463/146
See application file for complete search history.

(56) References Cited

U.S. PATENT DOCUMENTS 6,981,158 B1   12/2005   Sanchez et al.
7,814,546 B1   10/2010   Strayer et al.
(Continued)

FOREIGN PATENT DOCUMENTS

CN   102123389   7/2011
CN   102711107   10/2012
(Continued)

OTHER PUBLICATIONS

International Search Report dated May 3, 2021, for PCT/EP2021/055696, 4 pp.
(Continued)

*Primary Examiner* — Michael Won
(74) *Attorney, Agent, or Firm* — Nixon & Vanderhye P.C.

(57) ABSTRACT

A computer-implemented method of analysing anomalous network traffic in a telecommunications network, said telecommunications network comprising a plurality of network entities (120, 110) and a security analyser (130-3), wherein the method comprises the steps of: receiving at the security analyser a network communication from a first network entity; identifying the first network entity; by means of the security analyser: analysing the network communication and/or a performance of the first network entity thereby to identify the network communication as an anomalous communication (310); in response to identifying the network communication as an anomalous communication, communicating an instruction to the identified first network entity to respond with origin information regarding the anomalous communication, wherein the origin information identifies a
(Continued)

preceding network entity from which the anomalous communication was directly received by the first network entity (320, 330); and commencing with the preceding network entity, iteratively communicating an instruction to a preceding network entity to respond with origin information for identifying another preceding network entity from which the anomalous communication was directly received until a source network entity from which the anomalous communication originated is identified (380, 390; and applying a security policy to the identified source network entity (370).

16 Claims, 3 Drawing Sheets

(56) References Cited

U.S. PATENT DOCUMENTS

| | | | |
|---|---|---|---|
| 9,680,852 | B1 | 6/2017 | Wager et al. |
| 9,762,599 | B2 | 9/2017 | Wager et al. |
| 10,291,645 | B1 | 5/2019 | Frantzen et al. |
| 10,848,514 | B2* | 11/2020 | Christian ............... G06N 99/00 |
| 11,005,839 | B1* | 5/2021 | Shahidzadeh ......... H04W 12/06 |
| 2004/0015719 | A1* | 1/2004 | Lee ..................... H04L 63/0227 709/224 |
| 2007/0064697 | A1 | 3/2007 | Nesbitt et al. |
| 2007/0130350 | A1* | 6/2007 | Alperovitch ........ H04L 63/1425 709/229 |
| 2007/0192863 | A1* | 8/2007 | Kapoor .................. H04L 67/10 726/23 |
| 2011/0149957 | A1 | 6/2011 | Lee et al. |
| 2014/0230059 | A1 | 8/2014 | Wang |
| 2019/0036963 | A1* | 1/2019 | Ahad ..................... H04L 43/04 |
| 2019/0205511 | A1* | 7/2019 | Zhan ................... H04L 63/1416 |
| 2020/0162503 | A1* | 5/2020 | Shurtleff ................ G06F 9/451 |
| 2020/0220875 | A1* | 7/2020 | Harguindeguy ...... H04L 63/101 |
| 2020/0267176 | A1* | 8/2020 | Asher ................ H04L 63/0263 |
| 2020/0382537 | A1* | 12/2020 | Compton ............ H04L 63/1416 |
| 2021/0095662 | A1* | 4/2021 | Hein ....................... F04B 49/06 |
| 2021/0273949 | A1* | 9/2021 | Howlett ................ H04L 67/141 |
| 2021/0306354 | A1* | 9/2021 | Raghuramu ........ H04L 63/1425 |
| 2022/0292222 | A1* | 9/2022 | Tikhomirov ........ G06F 21/6263 |
| 2023/0007027 | A1* | 1/2023 | Weingarten ............. H04L 41/40 |
| 2023/0370439 | A1* | 11/2023 | Crabtree ............. H04L 63/0428 |
| 2024/0048569 | A1* | 2/2024 | Shah ................... H04L 63/1416 |

FOREIGN PATENT DOCUMENTS

| | | |
|---|---|---|
| CN | 105636052 | 12/2018 |
| CN | 110474870 | 11/2019 |

OTHER PUBLICATIONS

Written Opinion of the ISA dated May 3, 2021, for PCT/EP2021/055696, 7 pp.
Extended European Search Report dated Jul. 24, 2020, for EP20167368.8, 10 pp.
GB Combined Search and Examination Report under Sections 17 and 18(3) dated Mar. 31, 2022, for GB Application No. 2004748.6, 6 pp.
Sally Floyd et al., "Pushback Messages for Controlling Aggregates in the Network", Internet Engineering Task Force, Jul. 2001, 13 pp., at URL: https://tools.ietf.org/pdf/draft-floyd-pushback-messages-00.pdf.
Xin Liu et al., "Identifying Malicious Nodes in Multihop IoT Networks using Dual Link Technologies and Unsupervised Learning", Open Journal of Internet of Things (OJIOT), vol. 4, Issue 1, 2018, pp. 109-125.
A paper by Quazi Mamun et al., "Ensuring Data integrity by Anomaly Node Detection during Data Gathering in WSNs", SecureComm, 2013, 2 pp., preview including abstract available at URL: https://link.springer.com/chapter/10.1007/978-3-319-04283-1_23.
Communication pursuant to Article 94(3) EPC dated May 6, 2024, issued for European Application No. 21 710 925.5 (5 pages).

* cited by examiner

METHOD OF ANALYSING ANOMALOUS NETWORK TRAFFIC

CROSS-REFERENCE TO RELATED APPLICATION(S)

This application is the U.S. national phase of International Application No. PCT/EP2021/055696 filed Mar. 5, 2021, which designated the U.S. and claims priority to GB 2004748.6 filed Mar. 31, 2020, the entire contents of each of which are hereby incorporated by reference.

FIELD OF INVENTION

The present invention relates to a method of analysing anomalous network traffic, and in particular in a network comprising Internet of Things (IoT) devices.

BACKGROUND

The 'Internet of Things' (IoT) grants connectivity to traditionally non-networked devices, such as sensors (e.g. temperature, optical and accelerometer sensors). Some applications of IoT devices include people counting (i.e. footfall measurement), monitoring of vehicular traffic, air quality, temperature and other environmental measures, and operating systems such as streetlights or traffic signals.

The use of the Internet of Things (IoT) for sensing the environment is growing, and the number of devices beginning to be connected to each other and to the "Cloud" over the Internet is estimated to be in the tens of billions. Many of these IoT devices have low processing power (and are, for example, based around a Raspberry Pi®, a small factor PC or an Application-Specific Integrated Circuit). IoT devices typically transmit their data to a nearby gateway (small computer) that has more compute, battery and/or network power and which is then responsible for transforming the data so that it can be sent on to a remote server for storing or processing the data by an application that will make sense of the data and typically then act upon the data (e.g. sense movement, therefore turn on lights).

As a result of the relatively rudimentary nature of IoT devices, IoT devices (especially those that operate in public areas) are prone to compromise by means of a malicious attack. Known malicious attacks include: denial of service; man in the middle; malware; and botnets. For example, malware may be introduced as part of a malicious attack on a network or even by way of physical tampering. A single compromised device can then spread malware to adjoining devices and even devices in other networks resulting in attacks being replicated across multiple networks very quickly.

Beyond malicious attacks, poor design and/or malfunction of an IoT device can also harm cause detriment to a network. As a result, both malicious attacks and faults within a network can cause harmful anomalous traffic that reduces the efficient and effective operation of a network.

It is often extremely difficult for network solutions (such as a security) deployed remotely to the IoT device (for example, in a Cloud-based system) to provide the right protection against anomalous traffic and their causes, since such remote security solutions may only observe the anomalous traffic at an endpoint of the network without having full visibility of the origin, cause and full extent of the anomalous traffic. Instead, typically only the IoT devices and their gateways that are in the path of the anomalous traffic have, in aggregate, this visibility.

It is therefore an aim of the present invention to alleviate at least the aforementioned problem.

STATEMENTS OF INVENTION

According to a first aspect of the present invention, there is provided: a computer-implemented method of analysing anomalous network traffic in a telecommunications network, said telecommunications network comprising a plurality of network entities and a security analyser, wherein the method comprises the steps of: receiving at the security analyser a network communication from a first network entity; identifying the first network entity; by means of the security analyser: analysing the network communication and/or a performance of the first network entity thereby to identify the network communication as an anomalous communication; in response to identifying the network communication as an anomalous communication, communicating an instruction to the identified first network entity to respond with origin information regarding the anomalous communication, wherein the origin information identifies a preceding network entity from which the anomalous communication was directly received by the first network entity; and commencing with the preceding network entity, iteratively communicating an instruction to a preceding network entity to respond with origin information for identifying another preceding network entity from which the anomalous communication was directly received until a source network entity from which the anomalous communication originated is identified; and applying a security policy to the identified source network entity.

As used herein, the network communications is preferably in the form of at least one network data packet. Preferably, the instruction is only communicated to a single network entity at a time. Optionally, said security policy is applied only to the identified source network entity or to each of the first and/or preceding network entities. Preferably, the anomalous communication is caused by a malicious attack on the network or a fault within the network. Preferably, analysing the network communication comprises analysing a/an: characteristics of the network communication; traffic flow; originating network address; data packet size; a count of data packets; noisy traffic pattern; invalid data packet attribute; a communication protocol; and/or payload data of a data packet. Preferably, analysing the performance of the first network entity comprises analysing usage of processing and/or memory resources. Preferably, the origin information comprises in relation to the anomalous communication a: network address; communication protocol type; characteristic payload data; and/or data type. Preferably, the method further comprises the step of generating the security policy in dependence on (or, as a function of) a signature of the anomalous communication that is generated in dependence on each origin information. Preferably, as used herein, the term "signature" is a profile and/or characteristic that may (preferably, uniquely) identify the anomalous communication as being anomalous.

Preferably, communicating each instruction is performed in response to determining that only an incomplete signature of the anomalous communication can be generated. Preferably, a complete signature is available to be generated when the source network entity is identified. Preferably, an incomplete signature prevents effective and/or efficient application of the security policy. Preferably, at least one of the plurality of network entities is in the form of an Internet of Things device. Optionally, at least one of the plurality of network entities is in the form of a network gateway, and in particular for serving an Internet of Things device. Preferably, the anomalous communication is communicated directly between a series of network entities that are each in the form of an Internet of Things device. Preferably, the instruction causes a pushback mechanism so as to respond with the origin information. Preferably, the origin information is retrieved from local memory of the network entity from which said origin information is requested. Preferably, the security policy is applied to the first network entity and/or to every preceding network entity.

Preferably, the security policy is configured to: control a network entity; control traffic to and/or from a network entity; control an application provided by a network entity; and/or reconfigure a network function of a network entity.

According to another aspect of the invention, there is provided a computer-readable storage medium comprising instructions that, when executed by a processor associated with the telecommunication network, causes the telecommunication network to perform a method as described above.

According to yet another aspect of the invention, there is provided a telecommunications network comprising: a plurality of network entities, including a first network entity; a security analyser, wherein security analyser is configured to receive a network communication from the first network entity; identify the first network entity; analyse the network communication and/or a performance of the first network entity thereby to identify the network communication as an anomalous communication; in response to identifying the network communication as an anomalous communication, communicate an instruction to the identified first network entity to respond with origin information regarding the anomalous communication, wherein the origin information identifies a preceding network entity from which the anomalous communication was directly received by the first network entity; and commencing with the preceding network entity, iteratively communicate an instruction to a preceding network entity to respond with origin information for identifying another preceding network entity from which the anomalous communication was directly received until a source network entity from which the anomalous communication originated is identified; and a remediator for applying a security policy to the identified source network entity.

Preferably, the security analyser and/or the remediator form part of a distributed computing system.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method and a telecommunications network as described herein and/or substantially as illustrated with reference to the accompanying drawings. The present invention is now described, purely by way of example, with reference to the accompanying diagrammatic drawings, in which.

SPECIFIC DESCRIPTION

Figure 1:
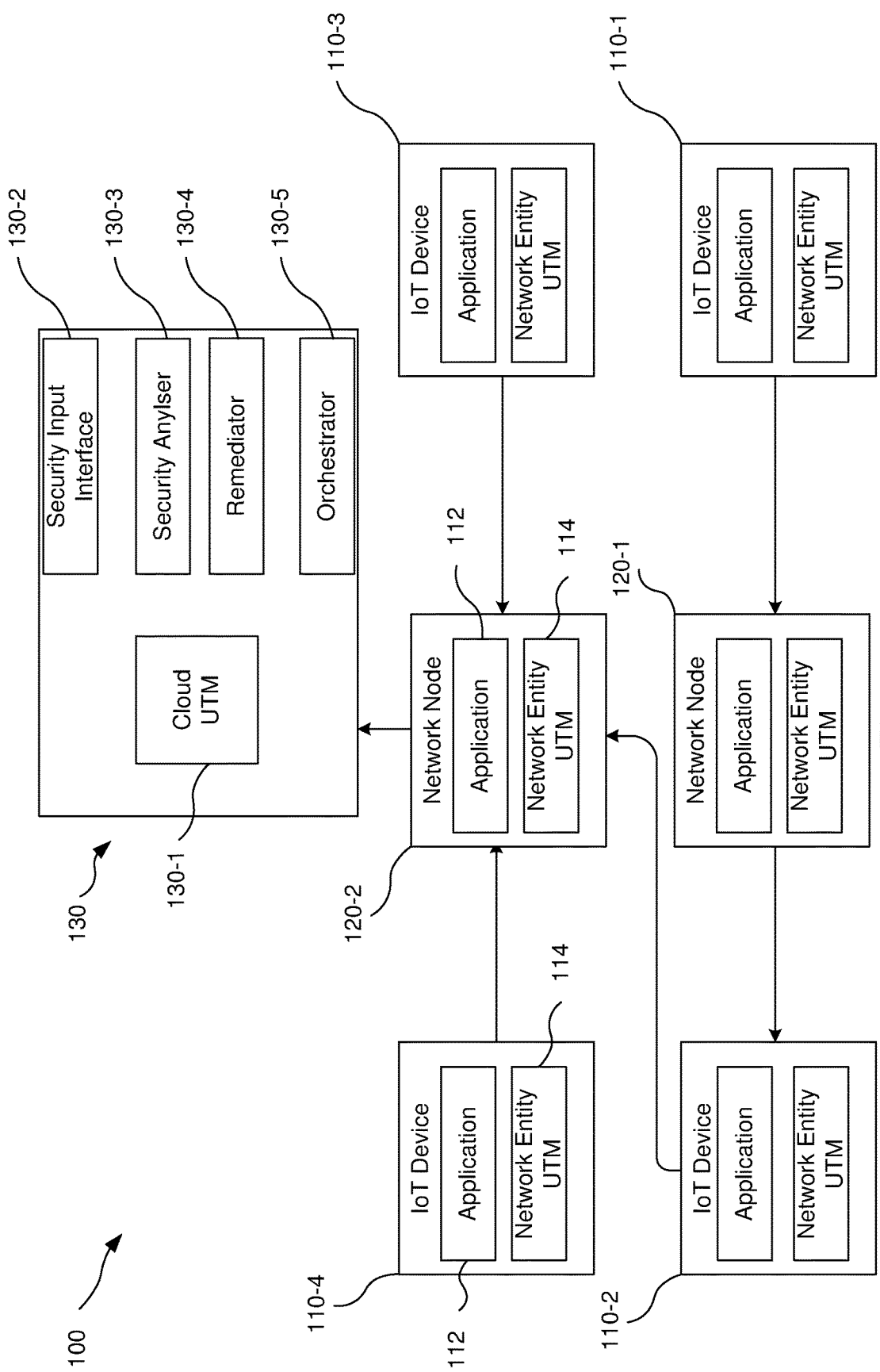
FIGS. 1 and 2 show a network.

FIG. 1 shows an Internet of Things (IoT) network 100 in the normal course of operation.

The network 100 comprises: a plurality of IoT devices 110; a plurality of network nodes 120; and a Cloud system 130. The IoT devices 110 and the network nodes 120 are individually referred to as a network entity.

The plurality of IoT devices comprises: a first 110-1, second 110-2, third 110-3 and fourth 110-4 IoT device. Each of the IoT devices 110 is configured to communicate with at least one of the plurality of network nodes 120.

The plurality of network nodes 120 comprises a first 120-1 and a second 120-2 network node. The network nodes 120 are, for example, in the form of a network gateway.

Each of the network entities 110 comprises an application 112 for facilitating the intended function of the network entity (e.g. recording measurements from a sensor in the case of an IoT device 110, controlling a wireless network transceiver, etc.), and a Network Entity Unified Threat Manager (UTM) 114.

The Network Entity UTM 114 system is configured to provide and/or facilitate security services for a network entity. Generally, a UTM is part of or forms a/an: firewall; anti-malware and/or anti-virus service; intrusion detection and/or prevention system; and/or virtual private networking interface. UTMs (including the Network Entity UTM 114) are available to be in the form of a virtualised hardware component that operates wholly locally (e.g. on an IoT device) or as an agent that is remotely managed by another system, such as by the Cloud system (and in particular the Cloud UTM, which is described below).

The Cloud system 130 comprises, at least, a/an: Cloud UTM 130-1; Security Input Interface 130-2; Security Analyser 130-3; Orchestrator 130-4; and a Remediator 130-5. The constituent components of the Cloud system 130 are described in more detail below. The Cloud system 130 is a distributed computing system, the various components of which are available to be hosted on various different networked hardware (which may change dynamically) at a number of different locations.

In FIG. 1, each of the IoT devices 110 and the network nodes are in a normal operating state; that is, operating in the absence of any anomalous traffic, such as due to a malicious network attack or faults. The IoT devices 110 communicate data (such as sensor data) to the Cloud system 130, and in the example of FIG. 1 this is performed via the following routes (as indicated via solid lines): the first IoT device communicates to a first network node 120-1, which in turn communicates with the second IoT device 110-2; the second IoT device 110-2 communicates with a second network node 120-2; the third 110-3 and fourth 110-4 IoT devices also communicate with the second network node 120-2; and the second network node then communicates with the Cloud system 130.

Figure 2:
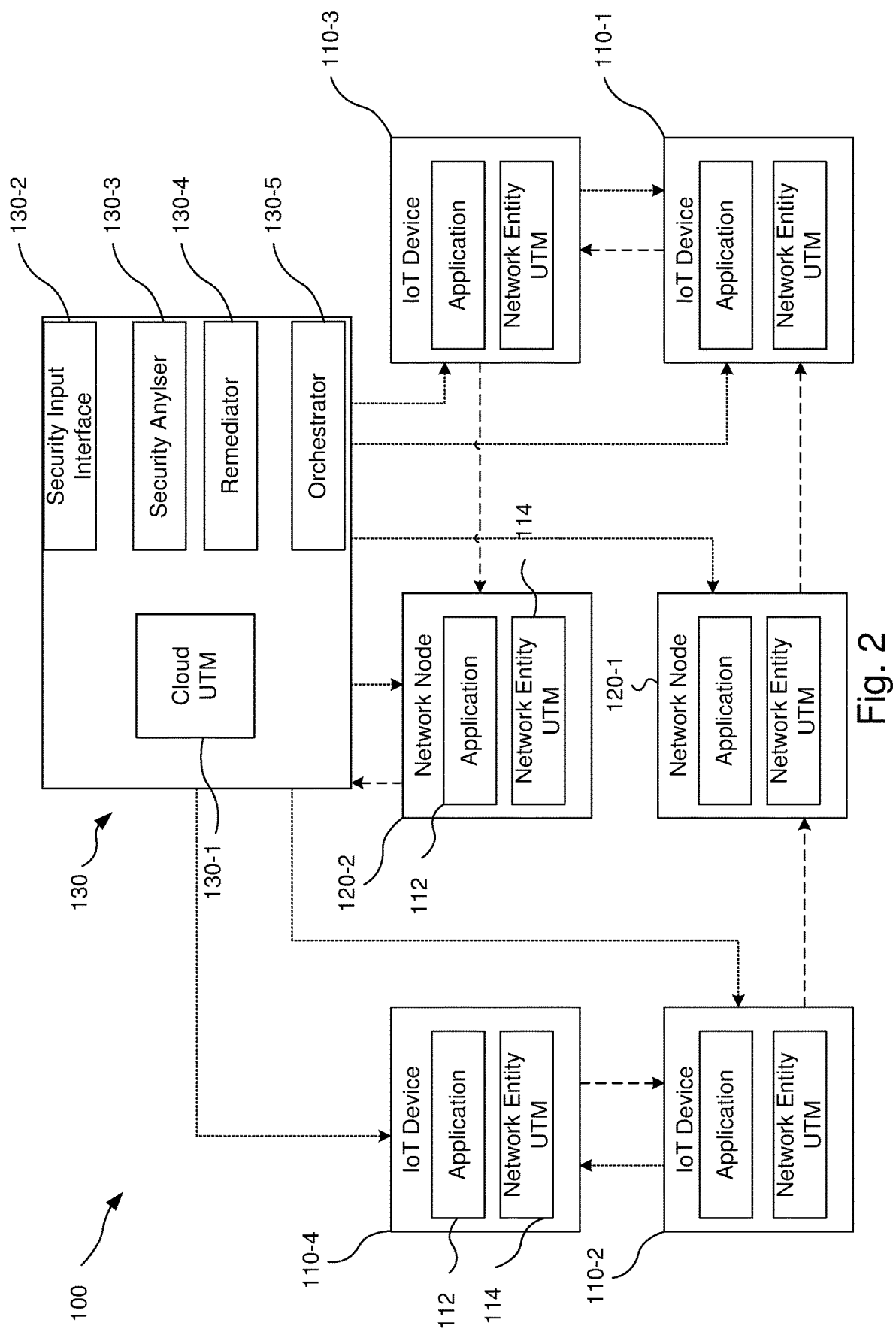

FIG. 2 shows a pathway (as indicated via dashed lines) of an anomalous communication within the network 100; unbeknownst to an operator or user of the network 100, the anomalous communication originates from the fourth 110-4 IoT device which has been compromised due to a malicious attack or a fault; this anomalous communication is then propagated in the following sequence, to the: second IoT device 110-2; first network node 120-1; first IoT device 110-1; third IoT device 110-3; second network node 120-2; and Cloud system 130.

Figure 3:
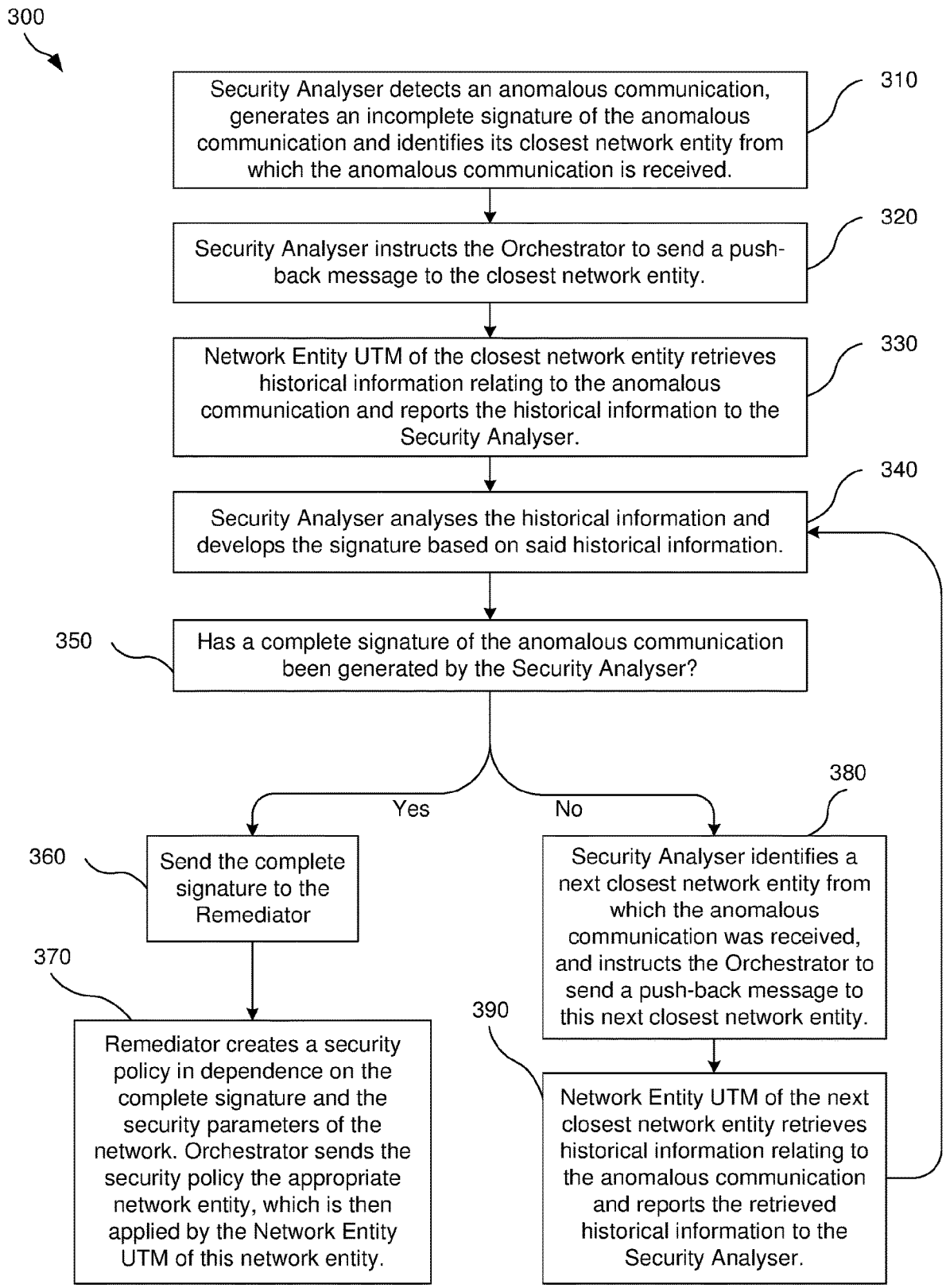
FIG. 3 shows a process for analysing anomalous traffic within the network.

FIG. 3 shows a process 300 for analysing the anomalous network traffic within the network 1100 so as to develop a full signature of the anomalous communication, and thereby to apply an appropriate security policy to remediate the anomalous communication, its effects and/or its cause. Process 300 is now described in combination with FIGS. 1 and 2.

In a first step 310 in process 300, the Security Analyser 130-3 receives a communication from the network 100; this communication is analysed by the Security Analyser 130-3, which identifies the communication to be an anomalous communication. To make this determination, the Security Analyser 130-3 comprises (albeit not shown in FIGS. 1 and 2 for conciseness) a network analyser and device analyser.

The network analyser is configured specifically to analyse operational characteristics of the network 100, such as: traffic flows; originating addresses of traffic; HTTP response and/or request sizes; numbers of requests; port information; noisy traffic patterns; invalid attribute values; URLs; communication protocols; and payload data. The device analyser is configured to analyse the operational performance of the network entities themselves, and in particular CPU and RAM usage. In this way, the network analyser and the device analyser are configured to monitor the network 100 and the network entities so as to identify occurrences of anomalous communications. The Security Analyser 130-3 also comprises an anomaly signature builder (also not shown in FIGS. 1 and 2). In response to identifying an anomalous communication, the anomaly signature builder compiles information that has been analysed by the network analyser and/or the device analyser relating to the anomalous communication, thereby to help develop a signature of the anomalous communication.

In process 300, the information compiled by the network analyser and/or the device analyser concerning the anomalous communication is insufficient to develop a full signature of the anomalous communication, and only an incomplete signature is generated at this stage by the anomaly signature builder. The incomplete signature comprises only information from the network entity from which the anomalous communication was directly received by the Cloud system 130 (herein referred to as the "closest network entity"). The incomplete signature does not, however, comprise information relating to, at least, the origin within the network 100 of the anomalous communication. In the example of FIG. 2, the anomalous communication is received by the Cloud system 130 from the second network node 120-2, which is therefore identified by the Security Analyser 130-3 as the closest network entity.

In order for an effective security policy to be applied to the network 100, the Cloud system (specifically the Remediator 130-4, as described in more detail below) requires an adequate signature of the anomalous communication.

To this end, at a next step 320, the Security Analyser 130-3 instructs the Orchestrator 130-5 to communicate a push-back message to the closest network entity that was identified at preceding step 310. As shown in FIG. 2, the push-back message of step 320 is communicated from the Cloud system 130 to the second network node 120-2 (as indicated via a dotted line).

The push-back message is an instruction for a receiving network entity (i.e. the closest network entity at step 320) to retrieve from its memory historical information associated with the anomalous communication identified at step 310. The historical information includes information that allows identification of, at least, the network entity from which the anomalous communication was directly received and/or information to help develop the signature associated with the anomalous communication. For example, the historical information includes a: traffic type; network address (e.g. IP address); protocol type; port number; and/or pattern information.

In response to receiving the push-back message from the Orchestrator 130-5, at step 330, the Network Entity UTM 114 of the closest network entity instructs local retrieval of the historical information associated with the anomalous communication, and then forwards said historical information to the Security Analyser 130-3.

At a next step 340, the historical information that is received by the Security Analyser 130-3 from preceding step 330 is analysed by the Security Analyser (and specifically by the network analyser and the device analyser), and the results of this analysis are forwarded to the anomaly signature builder so as add to the signature any new information that characterises the anomalous communication.

Once the signature has been updated at step 340, the anomaly signature builder assess whether the updated signature is now sufficiently complete so as to allow effective remediation of the anomalous communication and/or its cause. In one example, the signature is determined to be complete if, in relation to a true source of the anomalous communication, it comprises: an identifier for the exact source; a protocol; a type of data; an identifier of an application that initialised the anomalous communication; a frequency with which the anomalous communication is sent; and/or a list of other network entities through which the anomalous communication has traversed.

If the signature is determined at step 350 to be complete, then the Security Analyser 130-3 communicates the complete signature to the Remediator 130-4 at a next step 360. Following step 360, at a next step 370, the Remediator 130-4, in dependence on the complete signature, determines a tailored security response for countering the anomalous communication and/or its cause. The security policy is also determined by a security level for the network, which is configured by a user or an operator of the network 100 by means of inputs to the Security Input Interface 130-2. The security policy is available to remediate the threat of the anomalous communication, for example by applying (not least by means of a given Network Entity UTM) a policy to:

control a network entity, such as;
        shutting down a network entity; and
        limiting processing resources of a network entity;
    control traffic to and/or from a network entity, such as by:

ceasing traffic, including closing a port of a network entity, performing IP address blocking or applying other blocking techniques;
throttling traffic;
redirecting traffic;
enveloping traffic, for example by means of a VXLAN or a VPN; and/or
control an application loaded on a network entity, such as:
patching the application;
terminating the application; and/or
apply IPS signatures.

Accordingly, the Remediator 130-4 instructs the Orchestrator 130-5 to implement the determined security policy to the network, and the Orchestrator translates the security policy into an instruction (e.g. into a structured YAML format) for the Cloud UTM 130-1 to cause, by means of an appropriate communication, the Network Entity UTM 114 of the appropriate network entity (or entities) to implement the security policy.

If, however, the signature is determined at step 350 still to be incomplete, in a first iteration of step 380, based on the historical information received at immediately-preceding step 330, the Security Analyser identifies a network entity from which the closest network entity received the anomalous communication (herein referred to as the "next closest network entity"). Accordingly, the Security Analyser 130-3 instructs the Orchestrator 130-5 to send a further push-back message to this next closest network entity. In the example of FIG. 2, at this point in process 300, the next closest network entity is the third IoT device 110-3, accordingly the Orchestrator sends a push-back message to the third IoT device 110-3 (again, as indicated via a dotted line).

In response to the push-back message, at step 390 (and in a corresponding manner to step 330) the Network Entity UTM of the next closest network entity retrieves historical information relating to the anomalous communication and reports the retrieved historical information to the Security Analyser 130-3.

At this point, process 300 reiterates to step 340 such that the Security Analyser analyses the historical information from the next closest network entity received from immediately preceding step 390.

In this way, it can be seen that process 300 will continue to reiterate until a complete signature is generated from historical information compiled in response to the push-back messages that are issued along the entire pathway (in reverse) of the anomalous communication.

In the example of FIG. 2 therefore, process 300 will reiterate such that the historical information retrieved from the third IoT 110-3 indicates that only an incomplete signature is attainable, and identifies its next closest network entity as the first IoT device 110-1. In a corresponding way, the first IoT device 110-1 allows the Security Analyser to identify the first network node 120-1 as its next closest network entity, and so on until the Security Analyser identifies the source of the anomalous communication as the fourth IoT device 110-4, thereby compiling sufficient information relating to the anomalous communication so as to generated a completed signature.

As per steps 360 and 370, the Remediator 130-4 applies a security policy to, at least, the fourth IoT device 110-4, thereby to remediate the source of the anomalous communication, which has been compromised Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A computer-implemented method of analysing anomalous network traffic in a telecommunications network, said telecommunications network comprising a plurality of network entities and a security analyser, wherein the method comprises the steps of:
receiving at the security analyser a network communication from a first network entity;
identifying the first network entity;
by means of the security analyser:
analysing the network communication and/or a performance of the first network entity thereby to identify the network communication as an anomalous communication;
in response to identifying the network communication as an anomalous communication, communicating an instruction to the identified first network entity to respond with origin information regarding the anomalous communication, wherein the origin information identifies a preceding network entity from which the anomalous communication was directly received by the first network entity; and
commencing with the preceding network entity, iteratively communicating an instruction to a preceding network entity to respond with origin information for identifying another preceding network entity from which the anomalous communication was directly received until a source network entity from which the anomalous communication originated is identified; and
applying a security policy to the identified source network entity; and
generating the security policy in dependence on a signature of the anomalous communication that is generated in dependence on each origin information;
wherein communicating each instruction is performed in response to determining that only an incomplete signature of the anomalous communication can be generated.

2. A method according to claim 1, wherein the anomalous communication is caused by a malicious attack on the network or a fault within the network.

3. A method according to any claim 1, wherein analysing the network communication comprises analysing a/an: characteristic of the network communication; traffic flow; originating network address; data packet size; a count of data packets; noisy traffic pattern; invalid data packet attribute; a communication protocol; and/or payload data of a data packet.

4. A method according to claim 1, wherein analysing the performance of the first network entity comprises analysing usage of processing and/or memory resources.

5. A method according to claim 1, wherein the origin information comprises in relation to the anomalous communication a: network address; communication protocol type; characteristic payload data; and/or data type.

6. A method according to claim 1, wherein at least one of the plurality of network entities is in the form of an Internet of Things device.

7. A method according to claim 6, wherein the anomalous communication is communicated directly between a series of network entities that are each in the form of an Internet of Things device.

8. A method according to claim 1, wherein the instruction causes a pushback mechanism so as to respond with the origin information.

9. A method according to claim 1, wherein the origin information is retrieved from local memory of the network entity from which said origin information is requested.

10. A method according to claim 1, further comprising the step of applying the security policy to the first network entity.

11. A method according to claim 1, further comprising the step of applying the security policy to every preceding network entity.

12. A method according to claim 1, wherein the security policy is configured to: control a network entity; control traffic to and/or from a network entity; control an application provided by a network entity; and/or reconfigure a network function of a network entity.

13. A computer-readable storage medium comprising instructions that, when executed by a processor associated with the telecommunication network, causes the telecommunication network to perform the method according to claim 1.

14. A telecommunications network comprising:
a plurality of network entities, including a first network entity;
a security analyser, wherein security analyser is configured to
receive a network communication from the first network entity;
identify the first network entity;
analyse the network communication and/or a performance of the first network entity thereby to identify the network communication as an anomalous communication;
in response to identifying the network communication as an anomalous communication, communicate an instruction to the identified first network entity to respond with origin information regarding the anomalous communication, wherein the origin information identifies a preceding network entity from which the anomalous communication was directly received by the first network entity; and
commencing with the preceding network entity, iteratively communicate an instruction to a preceding network entity to respond with origin information for identifying another preceding network entity from which the anomalous communication was directly received until a source network entity from which the anomalous communication originated is identified; and
a remediator for applying a security policy to the identified source network entity; wherein:
the security analyser is further configured to generate the security policy in dependence on a signature of the anomalous communication that is generated in dependence on the origin information; and
the communication of the instruction is performed in response to a determination that only an incomplete signature of the anomalous communication can be generated.

15. A telecommunications network according to claim 14, wherein the security analyser and/or the remediator form part of a distributed computing system.

16. A security analyser comprising storage memory storing computer-readable code and at least one processor which upon execution of the code enables the security analyser to at least be configured to:
receive a network communication from a first network entity;
identify the first network entity;
analyse the network communication and/or a performance of the first network entity thereby to identify the network communication as an anomalous communication;
in response to identifying the network communication as an anomalous communication, communicate an instruction to the identified first network entity to respond with origin information regarding the anomalous communication, wherein the origin information identifies a preceding network entity from which the anomalous communication was directly received by the first network entity; and
commencing with the preceding network entity, iteratively communicate an instruction to a preceding network entity to respond with origin information for identifying another preceding network entity from which the anomalous communication was directly received until a source network entity from which the anomalous communication originated is identified; and
apply a security policy to the identified source network entity; wherein:
the security analyser is further configured to generate the security policy in dependence on a signature of the anomalous communication that is generated in dependence on the origin information; and
the communication of the instruction is performed in response to a determination that only an incomplete signature of the anomalous communication can be generated.

* * * * *